(12) United States Patent
Keyvanloo

(10) Patent No.: US 8,192,105 B2
(45) Date of Patent: Jun. 5, 2012

(54) SET OF COMPONENTS ABLE TO BE COUPLED TOGETHER

(75) Inventor: Aydin Keyvanloo, Melbourne (AU)

(73) Assignees: Aydin Keyvanloo, Melbourne, Victoria (AU); Andreas Klaus Gesswein, Rinteln, Lower Saxony (DE); Liang Tung, Taipei (TW)

( * ) Notice: Subject to any disclaimer, the term of this patent is extended or adjusted under 35 U.S.C. 154(b) by 178 days.

(21) Appl. No.: 12/520,131

(22) PCT Filed: Dec. 18, 2007

(86) PCT No.: PCT/AU2007/001950
§ 371 (c)(1),
(2), (4) Date: Jun. 19, 2009

(87) PCT Pub. No.: WO2008/074066
PCT Pub. Date: Jun. 26, 2008

(65) Prior Publication Data
US 2010/0014912 A1    Jan. 21, 2010

(30) Foreign Application Priority Data

Dec. 19, 2006   (AU) ................................ 2006907063
Mar. 29, 2007   (AU) ................................ 2007901689
Jul. 18, 2007    (AU) ................................ 2007903876

(51) Int. Cl.
*F16B 7/22* (2006.01)
(52) U.S. Cl. ........ 403/171; 403/315; 403/348; 403/353; 403/359.3
(58) Field of Classification Search .................. 403/171, 403/172, 231, 295, 315–319, 327, 348, 353, 403/354, 359.3, 359.4; 312/257.1; 211/189; 108/158.11
See application file for complete search history.

(56) References Cited

U.S. PATENT DOCUMENTS
2,921,634 A * 1/1960 Bloudoff ....................... 285/82
(Continued)

FOREIGN PATENT DOCUMENTS
EP    1 030 066    8/2000
(Continued)

OTHER PUBLICATIONS
International Preliminary Report on Patentability dated Mar. 30, 2009 for Application No. PCT/AU2007/001950.
(Continued)

*Primary Examiner* — Joshua Kennedy
(74) *Attorney, Agent, or Firm* — Frost Brown Todd LLC

(57) ABSTRACT

A set (10), including a first component (12) having one or more stub portions (16) extending from the first component (12), the one or more stub portions (16) being formed with at least one set of radially extending teeth (22) separated circumferentially by troughs (24), and a second component (14) having a socket portion shaped to receive one of the stub portions (16), wherein peripherally spaced formations (30) are provided on an interior surface of the socket portion. The stub portion (16) is able to be received within the socket of the second component (14) by aligning the teeth (22) of the stub portion (16) between the formations (30) of the socket, and wherein the stub portion and socket are thereafter connected by relatively rotating the first (12) or second components (14) such that the teeth (22) of the stub portion engage the formations (30) of the socket to couple the first and second components together.

16 Claims, 13 Drawing Sheets

U.S. PATENT DOCUMENTS

| | | | | |
|---|---|---|---|---|
| 3,155,405 | A * | 11/1964 | Cadovius | 403/13 |
| 3,407,561 | A * | 10/1968 | Peacock | 52/656.9 |
| 3,532,369 | A * | 10/1970 | Frederick | 403/176 |
| 3,666,298 | A * | 5/1972 | Reilly | 403/172 |
| 3,851,980 | A * | 12/1974 | Worth et al. | 403/172 |
| 3,893,774 | A * | 7/1975 | Hashioka | 403/171 |
| 4,023,913 | A * | 5/1977 | Berkowitz | 403/2 |
| 4,072,432 | A * | 2/1978 | Levy | 403/170 |
| 4,161,375 | A * | 7/1979 | Murphy | 403/169 |
| 4,770,560 | A * | 9/1988 | Ott | 403/296 |
| 5,052,849 | A * | 10/1991 | Zwart | 403/300 |
| 5,403,043 | A * | 4/1995 | Smet | 285/39 |
| 5,451,115 | A * | 9/1995 | Sayres | 403/171 |
| 5,938,365 | A * | 8/1999 | Grewe et al. | 403/231 |
| 6,151,810 | A * | 11/2000 | Mukai | 37/350 |

FOREIGN PATENT DOCUMENTS

| | | |
|---|---|---|
| GB | 1 011 688 | 12/1965 |

OTHER PUBLICATIONS

International Search Report dated Apr. 10, 2008 for Application No. PCT/AU2007/001950.

Written Opinion dated Apr. 2, 2008 for Application No. PCT/AU2007/001950.

\* cited by examiner

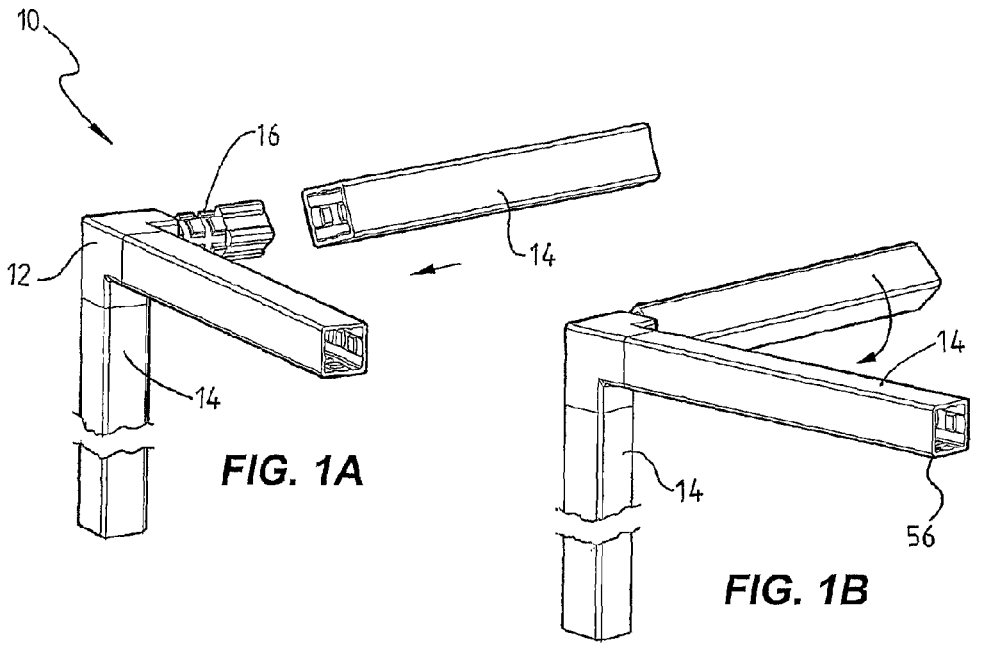
FIG. 1A
FIG. 1B
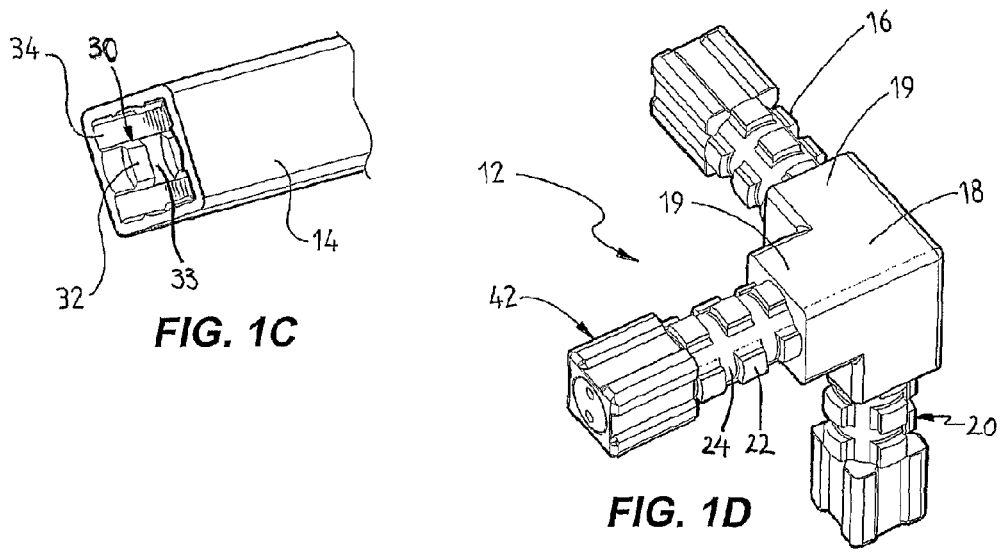
FIG. 1C
FIG. 1D
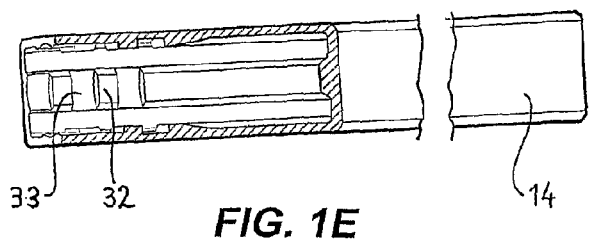
FIG. 1E

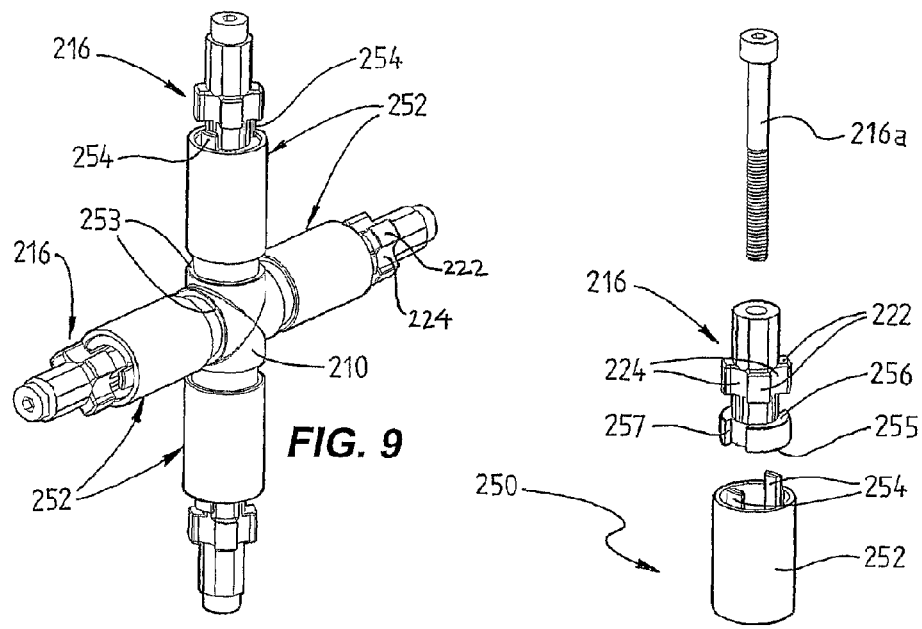
FIG. 9
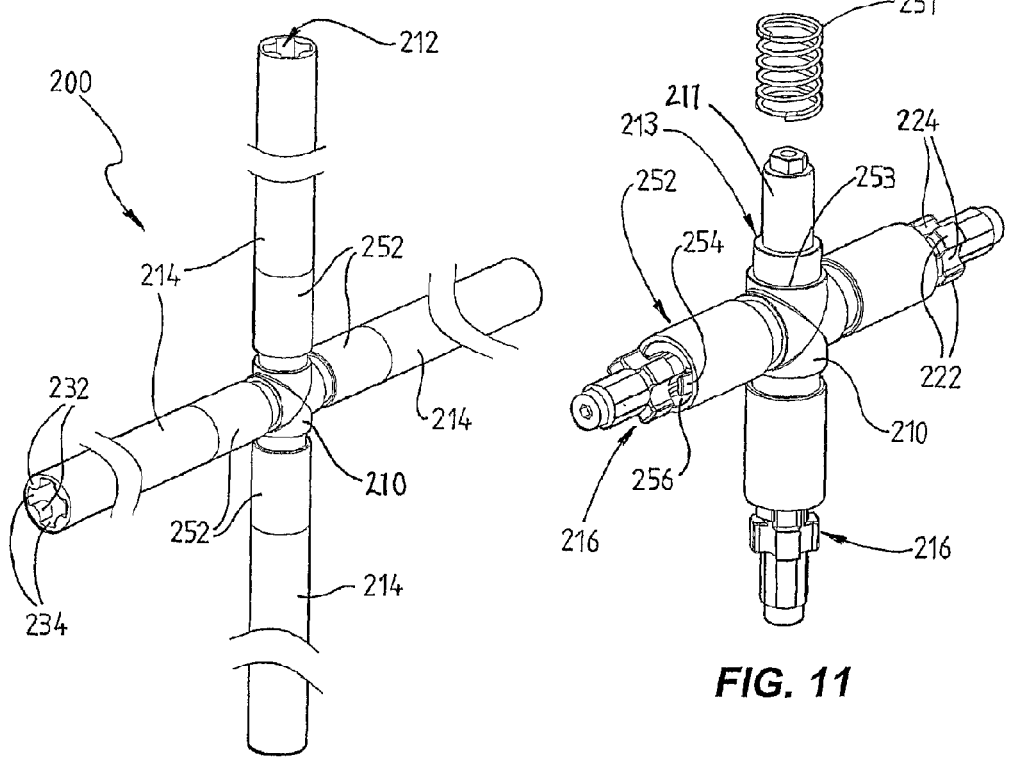
FIG. 10
FIG. 11

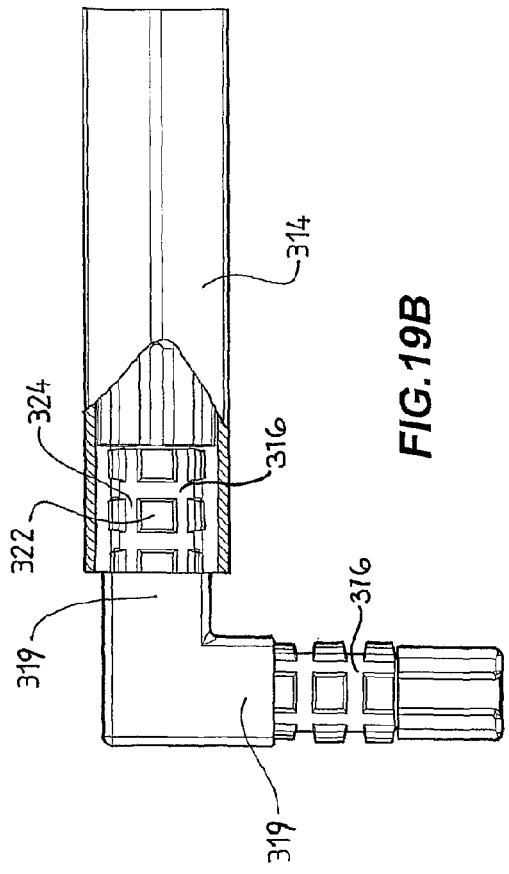
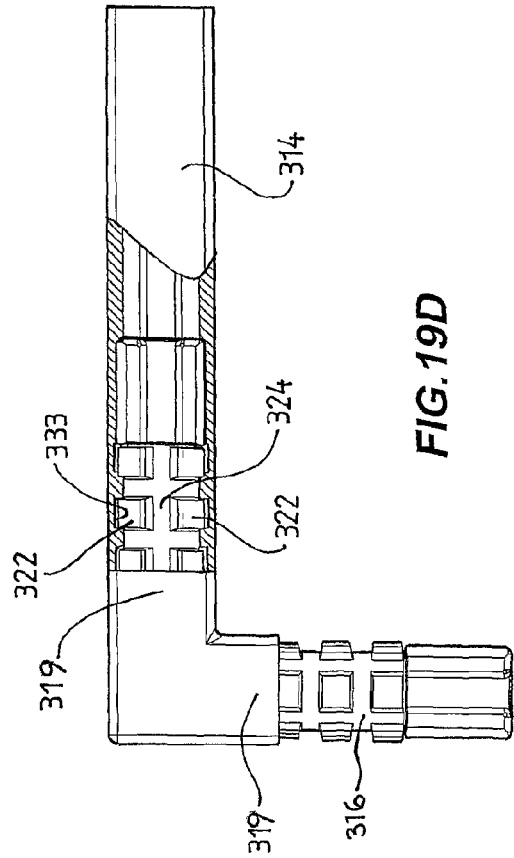
FIG.19A
FIG.19B
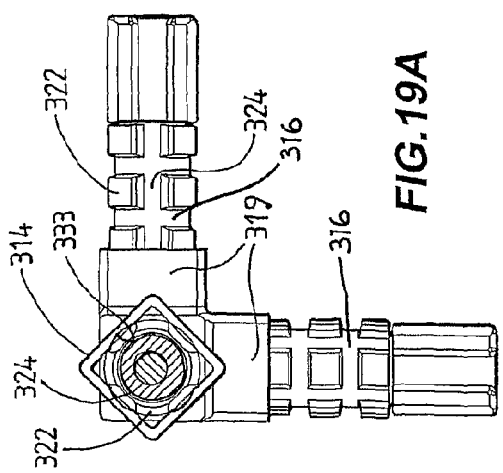
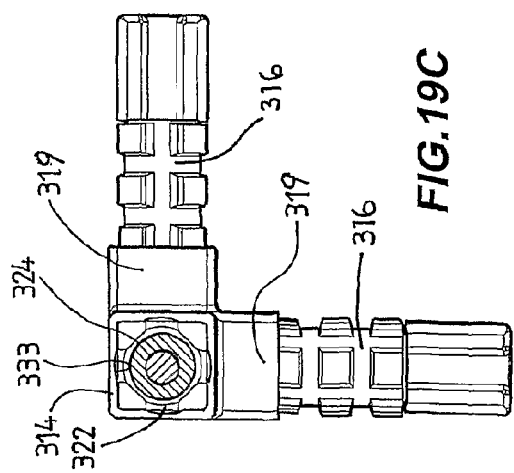
FIG.19C
FIG.19D

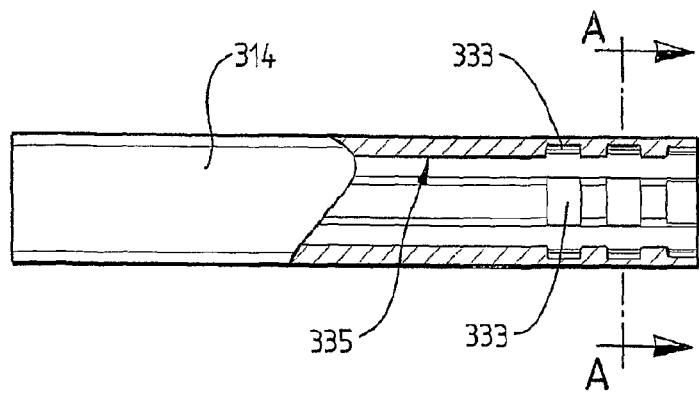
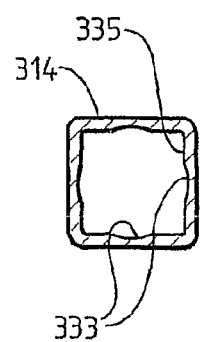
FIG. 20  FIG. 21
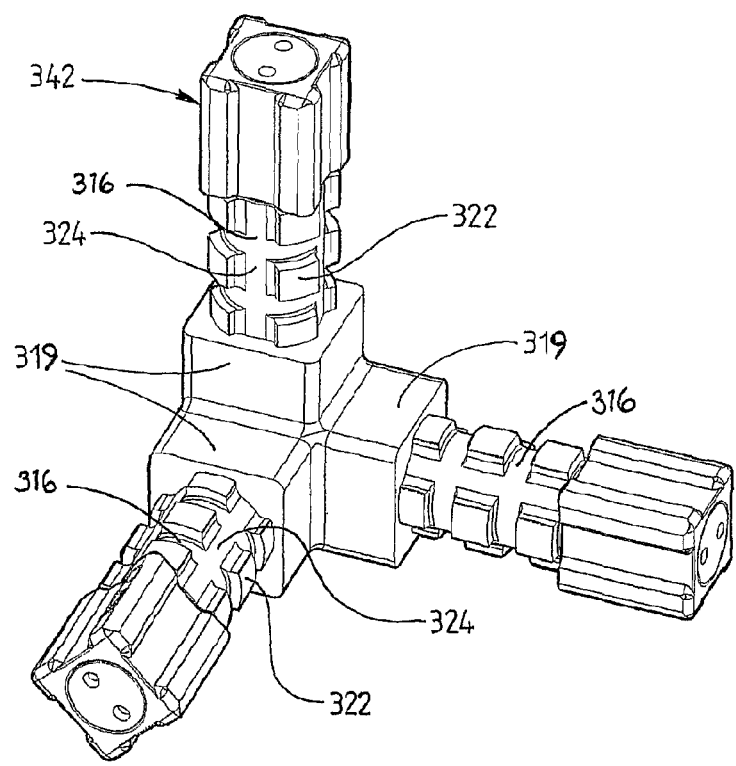
FIG. 22

SET OF COMPONENTS ABLE TO BE COUPLED TOGETHER

FIELD OF THE INVENTION

The present invention is directed to a set of components able to be coupled together. The set can be used for an open frame structure, preferably comprising a plurality of rod or tube members and interconnecting joints for connecting the rod or tube members. In particular, this invention is directed to the method of connecting the components of the set. A frame structure incorporating the set of components has particular application as a shop display structure or shelving system. It will be appreciated that the components that form the set according to the present invention can have various types of applications.

BACKGROUND OF THE INVENTION

Frame structures comprising a series of interconnected rod or tube members are well known and are used widely as shop display structures. They offer advantages over pre-assembled structures in that they can be manufactured and transported as smaller units requiring smaller packaging. Their modularity means that they can be constructed, typically in situ, into many different products as required.

Various methods of joining rod or tube members have been devised in the past. A common system involves the provision of connecting members or joints that are joined in a spigot and socket manner to the rod or tube members. The connecting joints are provided in various forms enabling the connection of multiple rod or tube members depending on the frame structure to be constructed.

Connection of the rod or tube members to the connecting joints and the subsequent maintenance of the connection has generally relied on the provision of connecting joints and rod or tube members having complementary cross-sections. One form of a connecting method relies on a frictional fit between connecting components. Another system relies on plastic deformation of at least one of the connecting components in order to maintain a secure connection when the frame structure has been constructed.

Connecting methods involving frictional fit or deformation of components have been observed to be subject to rapid wear and tear, particularly in commercial environments where shop display structures are frequently dismantled and reassembled. Wear and tear on components quickly leads to a deterioration of the connection and leads to loose and unstable frame structures.

The present applicant has recognised the need for an improved way in which components can be coupled together to form a frame structure that at least in part alleviates the disadvantages mentioned above, while still offering the advantages of modularity and easy construction.

SUMMARY OF THE INVENTION

Accordingly, the present invention provides a set of components able to be coupled together, including:
 a first component having one or more stub portions extending from the first component, the one or more stub portions being formed with at least one set of radially extending teeth separated circumferentially by troughs; and
 a second component having a socket portion shaped to receive one of the stub portions, wherein peripherally spaced formations are provided on an interior surface of the socket portion;
 wherein the stub portion is able to be received within the socket of the second component by aligning the teeth of the stub portion between the formations of the socket, and wherein the stub portion and socket are thereafter connected by relatively rotating the first or second components such that the teeth of the stub portion engage the formations of the socket to couple the first and second components together.

According to a first embodiment, the formations may be complementary teeth and troughs provided on an interior surface of the socket portion;
 wherein the stub portion is received within the socket of the second component by aligning the teeth of the stub portion with the troughs of the socket, and wherein the stub portion and socket are thereafter connected by relatively rotating the first or second components such that the teeth of the stub portion engage the teeth of the socket to couple the first and second components together.

According to a second embodiment, the formations may be notches cut in the interior wall of the socket. The teeth of the stub portion engage within the notches. The notches may be defined by the circumference of a circle, the circumference being greater than the width of the interior wall of the socket.

The first component may be a connecting element and the second component may be a tubular component, preferably of circular or square cross-section.

In a preferred embodiment, a plurality of sets of teeth are provided axially along the stub portion(s). The peaks and troughs of adjacent sets of teeth are axially aligned so as to define axially aligned peak regions separated by axially aligned trough regions. In this embodiment, the socket portion is provided with complementary formations defining axially aligned peak regions separated by axially aligned trough regions.

The stub portions are preferably of generally circular cross-section. In a preferred embodiment, a series of three sets of teeth are provided axially along the stub portions, although this number may be varied depending on the application.

In a particularly preferred embodiment, the or each set of teeth and troughs consists of four peaks and four troughs that alternate circumferentially about the stub portions such that the respective set generally resembles a square cross in axial cross-section.

Advantageously, the first component includes a generally cubic central portion having respective sides. Preferably, at least one stub portion extends from a side of the central portion. In preferred embodiments, each first component supports several stub portions. For example, a corner of a frame structure may be formed using a first component having three stub portions provided orthogonally to one another thereby connecting three second components. A panel structure may be formed by a plurality of first components having four stub portions provided in a plane.

The second components of the set are preferably formed as hollow tubular rods, and having a square external cross-section. Alternatively, the external cross-section may be circular or any other suitable shape. The second components are advantageously formed as an aluminium tube extrusion. In an alternate embodiment, the second components are formed as a stainless steel tube having a die cast insert to provide the internal structure necessary for connection to the stub portions of the first component.

According to one embodiment, internally, each of the extruded second components includes on the interior surfaces of an end portion, teeth formations complementary to those provided on the stub portions of the first component. Where a die cast insert is utilised, the teeth formations are provided on an internal surface of the die cast insert which is then inserted into an end of the stainless steel second component.

The first component advantageously further includes a locating device provided on each stub portion which assists in locating the stub portions in the respective socket portions of the second components. The locating device is preferably spring-loaded and once turned to engage, creates a positive stop at the locked position. The locating device preferably includes a set of locating teeth formed on an interior surface thereof that complement a set of locating teeth formed on each stub portion. The complementary sets of locating teeth advantageously permit rotation of the locating device radially about the stub portion in 45° increments. The locating device is preferably shaped such that once the respective stub portion and locating device is inserted into a socket portion and rotated through 45° to engage the teeth of the stub portion and the teeth of the socket portion, the locating device is prevented from turning relative to the second component.

It will be appreciated that in an alternate arrangement, the stub portions may be provided on the second component and the first component may include sockets to receive the stub portions of the second components.

In another aspect, the invention provides a frame structure including one or more of the sets of components described in accordance with the first aspect of the invention.

The frame structure may be attached to a wall or configured as a freestanding structure.

A frame structure may further include means for attaching at least one panel member to the structure.

The panel member is preferably a tile, a glass panel, or similar.

The invention may also extend to the first component and a second component described above provided as separate components.

In a particular advantageous embodiment, the set of components includes an axially slidable locking mechanism. A spring loaded tubular portion is slidably but irrotationally disposed about the first component rearward of the stub portion. At least one projection extends in an axial direction from the tubular portion toward the end of the stub portion. To receive the stub portion fully in the socket, the spring loaded tubular portion must be slid rearwardly withdrawing the projection(s) to allow the teeth and formations to be engaged. After relative rotation of the first and second components to engage the teeth, the tubular portion moves to introduce the projection(s) between the formations of the socket, preventing disengagement of the socket unless the tubular portion is first withdrawn to disengage the projection(s).

According to another embodiment, the invention provides a coupling for a frame structure, the coupling including a connecting member and at least one rod member, wherein:
  the connecting member includes one or more stub portions extending from the connecting member, the one or more stub portions being formed with a set of radially extending teeth separated circumferentially by troughs;
  the at least one rod member includes an end portion shaped to receive one of the stub portions, wherein complementary teeth and troughs are provided on an interior surface of the end portion; and
  wherein the stub portion is received within the at least one rod member by aligning the teeth of the stub portion with the troughs of the rod member, and wherein the stub portion and rod member are thereafter connected by relatively rotating the stub portion and the rod member such that the teeth of the stub portion engage the teeth of the rod member.

BRIEF DESCRIPTION OF THE DRAWINGS

The invention will now be described, by way of illustrative example only, with reference to the accompanying drawings in which:

FIG. 1A is a perspective view of a set according to an of an embodiment of the invention with the components spaced prior to connection;

FIG. 1B is a perspective view of the set of components of FIG. 1A being connected;

FIG. 1C is a perspective view of a second component of the set of FIGS. 1A and 1B;

FIG. 1D is a perspective view of a first component of the set of FIGS. 1A and 1B;

FIG. 1E is a partially cut-away perspective view of the second component of FIG. 1C;

FIG. 9 is a perspective view of a first component of a set of components according to a further embodiment of the invention;

FIG. 10 is a perspective view of a set with the first component of FIG. 9, with four connected second components;

FIG. 11 is a perspective partially exploded view of the first component of FIG. 9;

FIG. 19A is a cross-sectional end view of the set shown in FIG. 17;

FIG. 19B is a partial cross-sectional side view of the set shown in FIG. 17;

FIG. 19C is a cross-sectional end view of the set shown in FIG. 18;

FIG. 19D is a partial cross-sectional side view of the set shown in FIG. 18;

FIG. 20 is a partial cross-sectional side view of the second component shown in FIGS. 16 to 19;

FIG. 21 is a cross-sectional end view through lines A-A in FIG. 20; and

FIG. 22 is a perspective view of the first component shown in FIGS. 16 to 19.

DETAILED DESCRIPTION OF THE EMBODIMENTS

Figure 2:
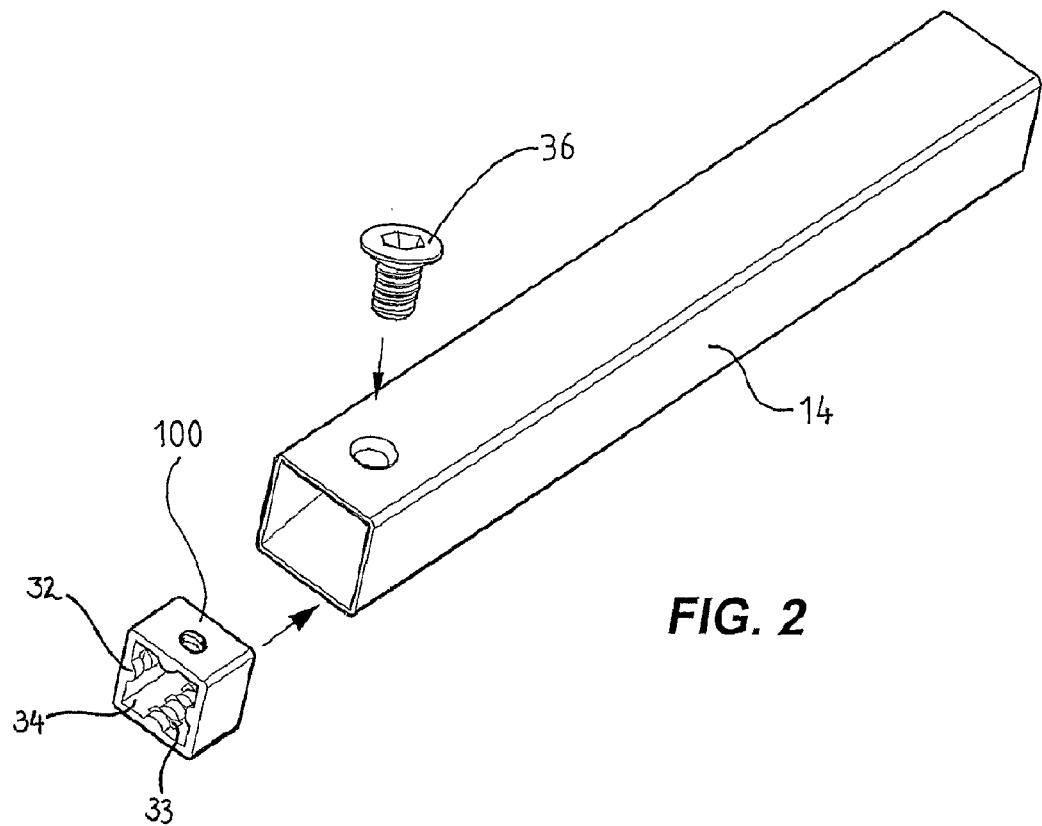
FIG. 2 is a perspective view of an alternate embodiment of the second component.

FIGS. 1A and 1B show a set of components or coupling 10 according to a first embodiment of the present invention. Set or coupling 10 includes a first component, such as connecting member 12 and second components, such as rod members 14. In this embodiment, three rod members 14 are illustrated such that when coupled to the connecting member, a corner of a frame structure is provided.

FIG. 1A shows a rod member 14 prior to connection with the connecting member 12. Connecting member 12 is provided with one or more stub portions 16 that extend outwardly from sides of a central portion 18 of the connecting member 12 (as shown in FIG. 1D). In this embodiment, the connecting member 12 is provided with three stub portions. The central portion 18 is generally cubic and the connecting member 12 includes short arms 19 extending between the central portion 18 and each of the stub portions 16.

The main shaft of each of the stub portions 16 is of generally circular cross-section and is provided with a series of circumferential sets of teeth 20, spaced axially along the stub portions 16. In this embodiment three sets of teeth 20 are illustrated but it will be appreciated that the invention includes the provision of one or more sets of teeth, as desired.

As best shown in FIG. 1D, each set of teeth 20 is formed by circumferentially alternating teeth 22 and troughs 24. When a series of sets of teeth 20 are provided adjacent but spaced from each other, the teeth 22 and troughs 24 define axially aligned peak regions and trough regions. In a particularly preferred embodiment, each set of teeth 20 includes four teeth 22 and four troughs 24 alternating radially about the stub portions 16 such that each set generally resembles a square cross in cross-section.

A rod member 14 is illustrated in FIGS. 1C and 1E. Rod member 14 is preferably a hollow aluminium tubular extrusion of square exterior cross section. Other materials may be employed and different external shapes can be provided depending of the application and desired aesthetics.

Rod member 14 is of the same external dimensions as the short arms 19 of the connecting member 12 such that when connected a smooth, almost seam-free appearance is obtained.

At one, preferably both ends of the rod member 14, the interior surface is provided with peripherally spaced formations. In the embodiment shown in FIGS. 1A to 1E, the formations take the form of sets of teeth projecting into the socket portion from the interior surface and complement the sets of teeth 20 of the stub portions 16. The sets of teeth of the rod member 14 similarly define circumferentially alternating teeth 32 and troughs 34, such that when a number of sets of teeth 30 are provided adjacent each other, axially aligned peak and trough regions are formed.

In an alternate embodiment of the invention illustrated in FIG. 2, rod member 14 is a stainless steel tube of square exterior cross section as described above. Sets of teeth comprising teeth 32 and troughs 34 are provided on a die cast insert 100 which is secured in one or both ends of the rod member 14 using a screw 36.

To couple the components of the embodiment of the invention shown in FIGS. 1A to 1E, the rod member 14 is rotated to a pre-determined angle with respect to the stub portion 16, advantageously 45°, so that the peak regions of the stub portion 16 align with the trough regions of the rod member 14, as illustrated in FIG. 1A. Once the stub portion 16 is fully inserted into the rod member 14, the rod member 14 is rotated until the exterior surface is properly aligned with the connecting member 14, and in doing so, the teeth 22 and 32 of the connecting member 12 and rod member 14 respectively are caused to engage, shown in FIG. 1B. This engagement is effected by the teeth 22 latching behind the teeth 32 to prevent longitudinal movement. Underneath each tooth 32, there is a notch 33 that is cut into the interior wall of the rod member 14. The teeth lock within the notches 33 providing a greater positive engagement of the teeth 22.

Figure 3:
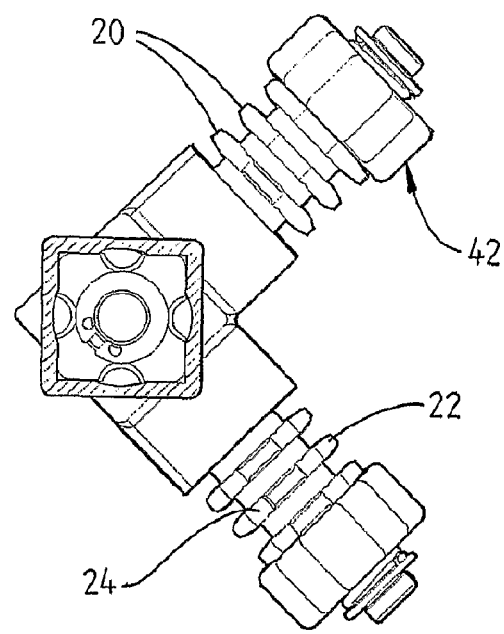
FIG. 3 is a side view, partially in cross-section, of a first component viewed along a second component.
Figure 4:
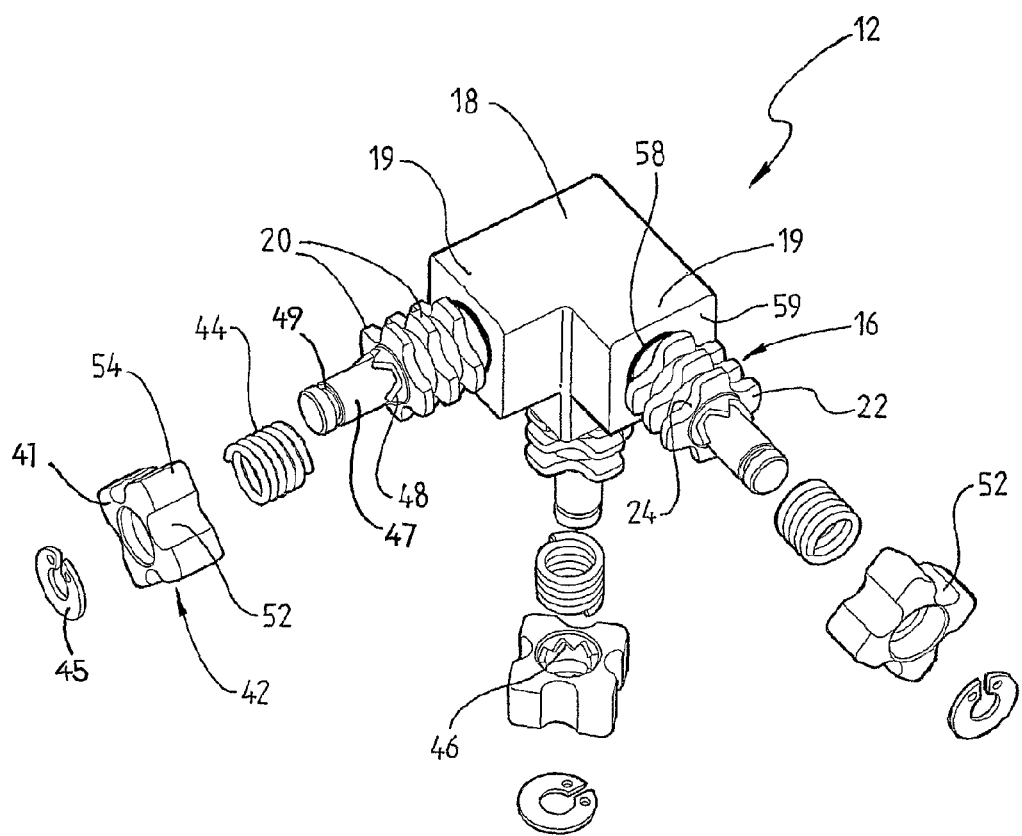
FIG. 4 is an exploded view of a first component according to an alternate embodiment.

In particularly preferred embodiments, the coupling 10 further includes a locating device 42 provided on the end of each stub portion 16 which assists in locating the stub portions 16 in the respective rod members 14, as shown in FIG. 1D. An alternate embodiment of the components is shown in FIGS. 3 and 4. The locating device is best illustrated in the exploded view of FIG. 4. The locating device 42 includes a head 41 that is spring-loaded by spring 44 acting between the head 41 and the outermost set of teeth 20 on stub portion 16. A circlip 45 holds the spring 44 and head 41 on the shaft 47 of the stub portion 16 by locking into recess 49 on shaft 47. Once the head 41 is turned to engage, it creates a positive stop at a locked position.

The locating device 42 includes a set of locating teeth 46 formed on an interior surface of the head 41 that complements a set of locating teeth 48 formed on an outside of shaft 47 next to the outermost set of teeth 20. The complementary sets of locating teeth 46, 48 advantageously permit rotation of the head 41 radially about the stub portion 16 in 45° increments.

The head 41 is shaped such that once the respective stub portion 16 and locating device 42 is inserted into a rod member 14 and rotated through 45° to engage the teeth 22 of the stub portion 16 and the teeth 32 of the rod member 14, the locating device 42 is prevented from turning relative to the rod member 42. The locating device 42 thereby serves to maintain the stub portion 16 and associated rod member 14 in either an unlocked or locked position. When in a locked position, a user is required to disengage the locating teeth 46, 48 of the coupling 10, thereby releasing the locating device 42 to an unlocked position.

As illustrated, the head 41 of the locating device 42 of this embodiment is generally of square external shape to correspond to the interior of the rod members 14. Each side of the head 41 is formed with a concave groove 52 that coincides with the troughs 24 of the stub portions 16. When the grooves 52 are axially aligned (by rotation of the head 41 with respect to the stub portion 16) with the troughs 24 of the stub portions 16, the stub portion 16 and locating device 42 may be inserted into a rod member 14. In this manner, the grooves 52 allow teeth 32 of the rod member 14 to slide into troughs 24 on the stub portion 16. The corners 54 of the head 41 are received within the corners 56 of the rod member 14 (shown in FIG. 1B). As the rod member 14 or stub portion 16 is rotated through 45° to engage teeth 22, 32, head 41 rotates with the rod member 14. Locating teeth 46, 48 engage after the 45° rotation to lock the stub portion 16 within the rod member.

The locating device 42 improves the function of the coupling by reducing the chance of a stub portion 16 and rod member 14 releasing when not intended and assists in separating and inserting the components. This in turn improves the appearance of the assembled structure by lining up the stub portions 16 and rod members 14 as intended.

FIG. 4 also illustrates a rubber seal 58 which is provided to improve the fit between the stub portion 16 and rod member 14 once connected. Seal 58 is preferably located in an annular groove (not illustrated) formed in the face 59 of each short arm 19 surrounding stub portion 16.

Figure 5A:
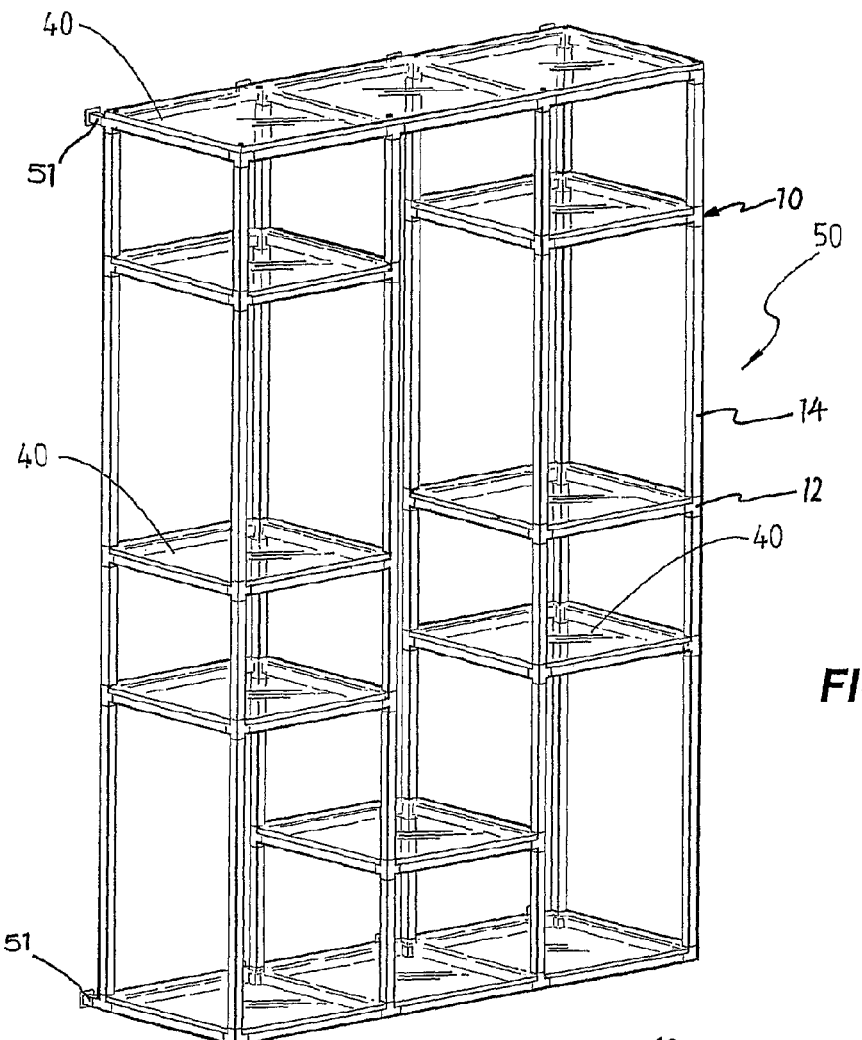
FIGS. 5A and 5B are perspective views of different frame structures incorporating the set of components of the invention.
Figure 5B:
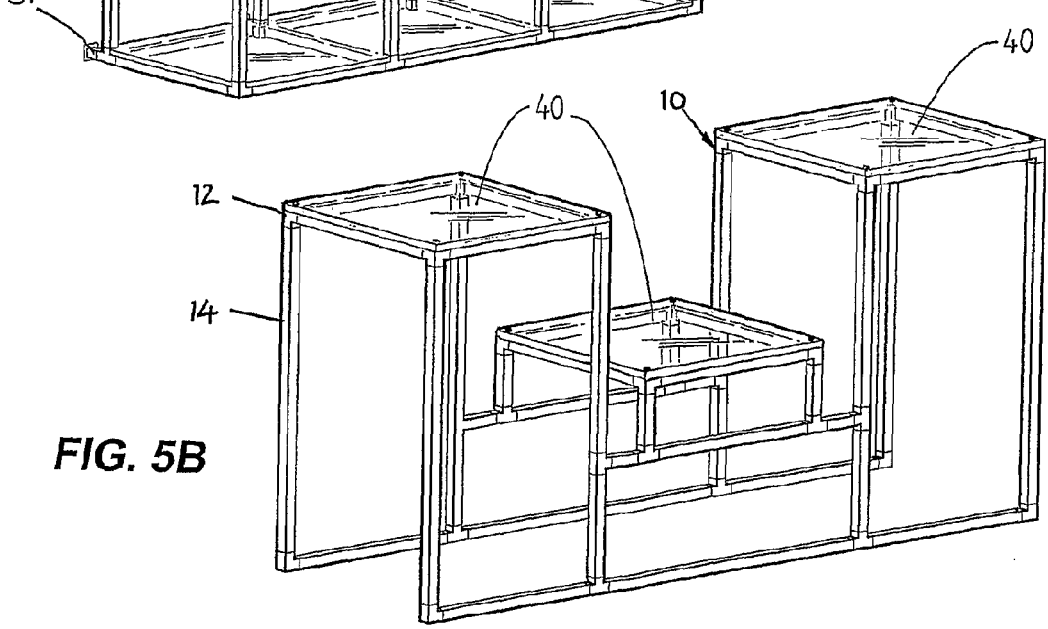

FIGS. 5A and 5B illustrate the variation in frame structures that can be constructed utilising the set of components of the invention. Panels 40 have been attached to the frame structure 50 to provided shelving which could be utilised in a domestic or commercial environment. As shown in FIG. 5A, there may be connectors 51 to allow temporary or permanent attachment to a wall or structure.

Figure 6:
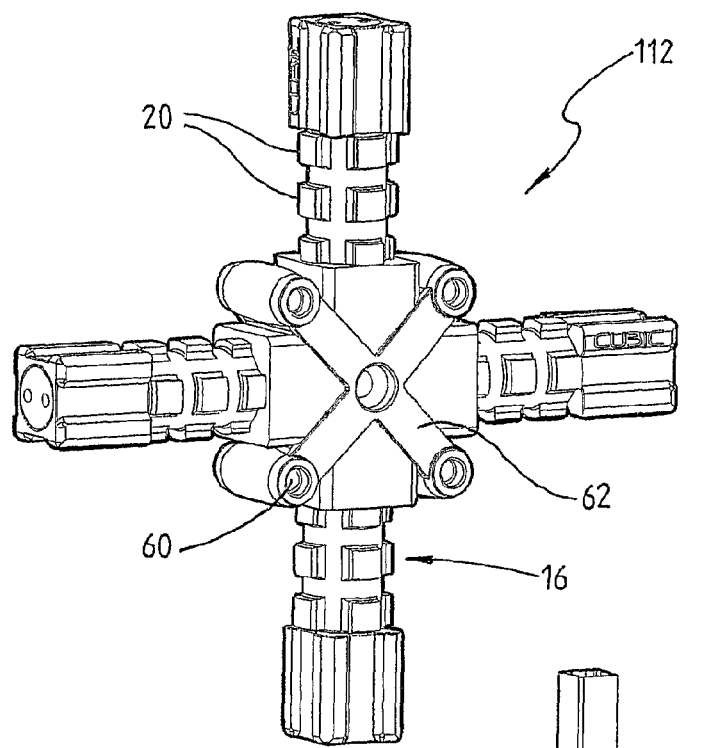
FIG. 6 is a perspective view of a first component according to a further embodiment of the invention and adapted to receive face panels.
Figure 7A:
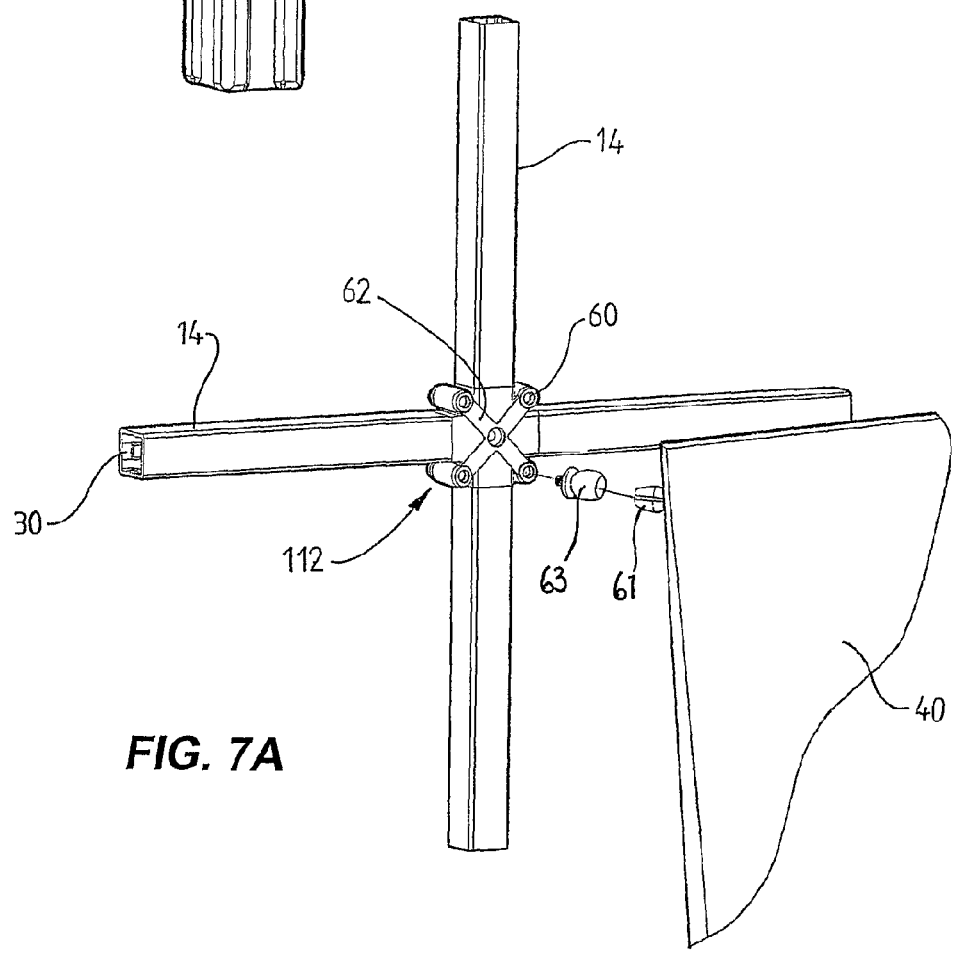
FIGS. 7A and 7B are perspective views of face panels being attached to the first component of FIG. 6.
Figure 7B:
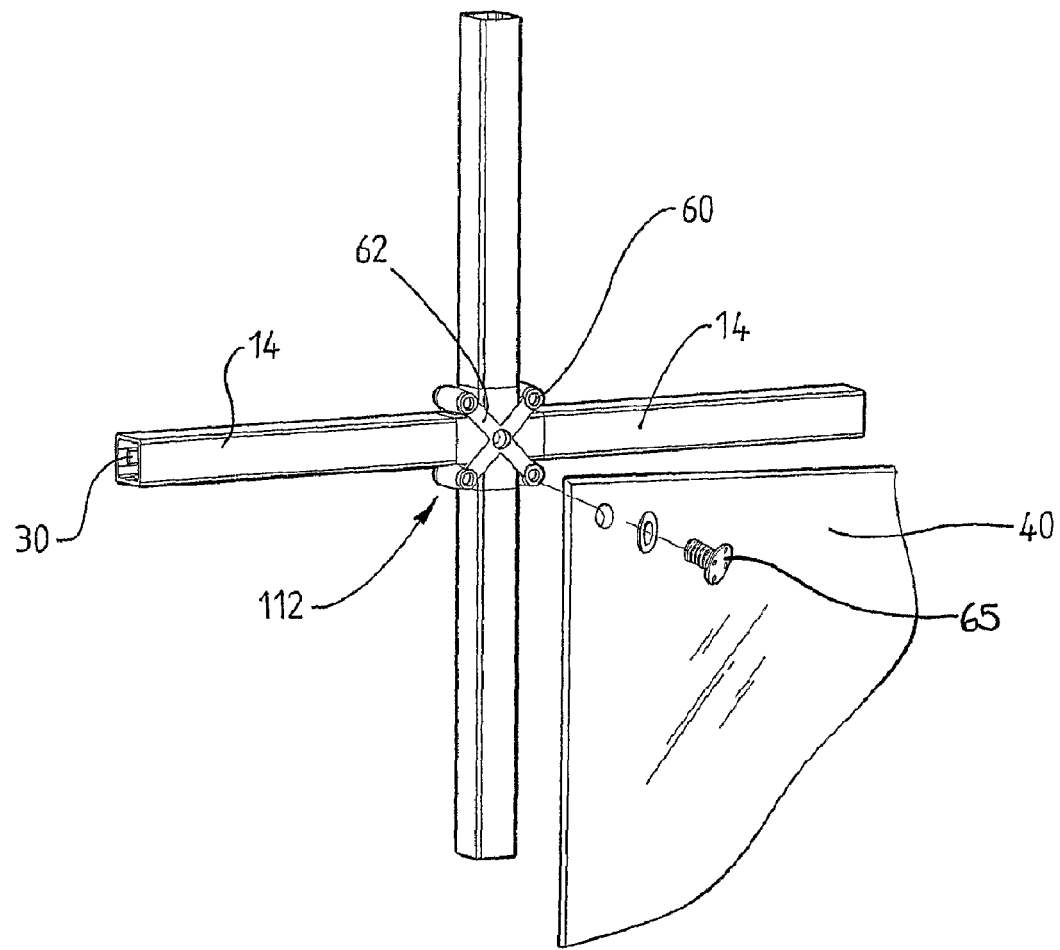

An alternate embodiment of the invention will now be described with reference to FIGS. 6, 7A and 7B. In this embodiment of the invention, connecting member 112 is additionally provided with a plurality of attachment points 60 for attaching panels 40 as mentioned above. As illustrated, the attachment points 60 are provided on the extremities of a cross-shaped attachment member 62. Attachment points 60 are located in the corners created by adjacent rod members 14 thereby forming corner attachment points for panels 40. Panels 40 may be glass or perspex panels, tiles, or other similar panel members. Where the panels are tiles, as shown in FIG. 7A, a female clip 61 is screwed to the connector, while a male clip 63 is attached to the back of the tile and subsequently clipped onto the female clip 61. Where the panels are glass panels, as shown in FIG. 7B, a screw 65 is used to secure the panel from the front to the attachment points 60.

The attachment points 60 provide sockets to which screws, or nuts and bolts may be inserted or attached in order to connect panels 40 to the connecting member 112. Alternatively, the panels 40 may be provided with attachment means on their rear surface which correspond to the attachment points 60.

Figure 8B:
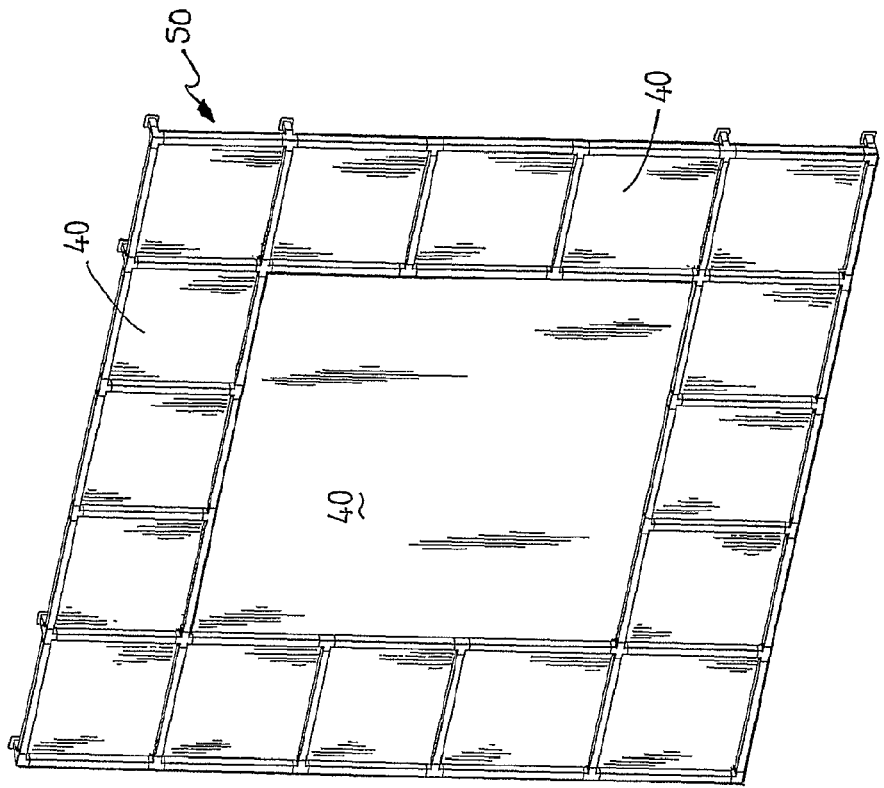
FIGS. 8A and 8B are perspective views of an enclosed frame structure and a 2-dimensional structure, respectively, incorporating the assembly of FIG. 6.
Figure 8A:
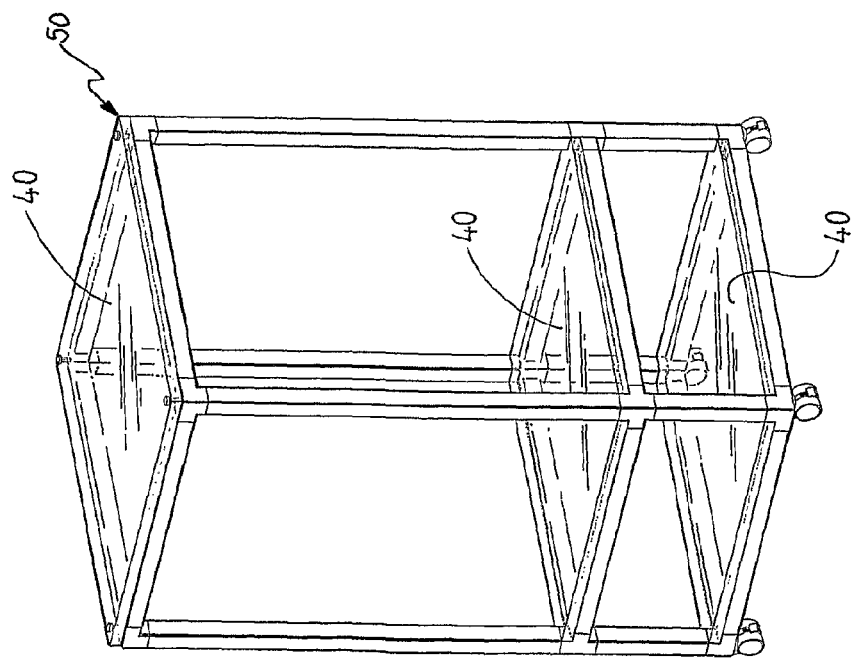

It will be appreciated that the coupling of each of the embodiments of the invention can be used to form both two and three-dimensional structures, the size and shape of which can be varied as required. The use of connecting member 112 provided with attachment points 60 further extends the utility of the frame structure by enabling the addition of panels 40. Where the frame structure 50 is two-dimensional it may be used, with the addition of panels 40, to create a visual display on a wall, for example, as illustrated in FIG. 8B.

The attachment points 60 may be used for attaching shelving, racking, lighting, castors, and other accessories thereby creating a functional as well as a visual product. To extend the versatility of the attachment points 60, they may be internally threaded, Attachment points 60 may also be utilised to fix the frame structure 50 to a wall, floor, or ceiling with the aid of screws or nuts and bolts. Advantageously, the created frame structure 50 and panels 40 are all detachable with minimum damage to the wall, floor or ceiling it is attached to.

Another embodiment of the invention is illustrated in FIGS. 9 to 15, in which elements corresponding to those of the first embodiment are indicated by similar numerals preceded by a "2". A set 200 includes a first component in the form of connecting element 210 that has four stub portions 216. Four respective second components in the form of tubular components 214 are coupled to the connecting element 210.

The stub portions 216 are formed with a set of four radial extending teeth 222 circumferentially separated by troughs 224. The tubular components 214 include a socket portion 212 that is shaped to receive one of the stub portions 216. Teeth 232 and troughs 234, complementary to the teeth 222 and troughs 224 on the stub portions, are provided on the interior surface of the socket portion 212. Stub portions 216 are hollow and retained in position by screws 216a at the outer ends of respective cylindrical arms 211 of connecting element 210 (as shown in FIG. 11).

An axially slidable locking mechanism 250 is provided on the connecting element 210. A spring loaded tubular portion or sleeve 252 is slidably but irrotationally disposed around the connecting element 210 rearward of each stub portion 216, as can be seen in FIG. 9. The sleeve 252 can be slid forward and rearward, but is biased by internal spring 251 into the forward position shown in FIGS. 9 and 10. Spring 251 sits against shoulder 213. The rearward limit is defined by a peripheral shoulder 253 on element 210, while the forward limit is determined by a rear shoulder of a peripheral land 255 of stub portion 216, best shown in FIG. 11.

The sleeve 252 includes two diametrically opposed rectangular projections 254 that extend in an axial direction toward the end of the stub portion 216 through slots 257 in land 255.

Figure 12:
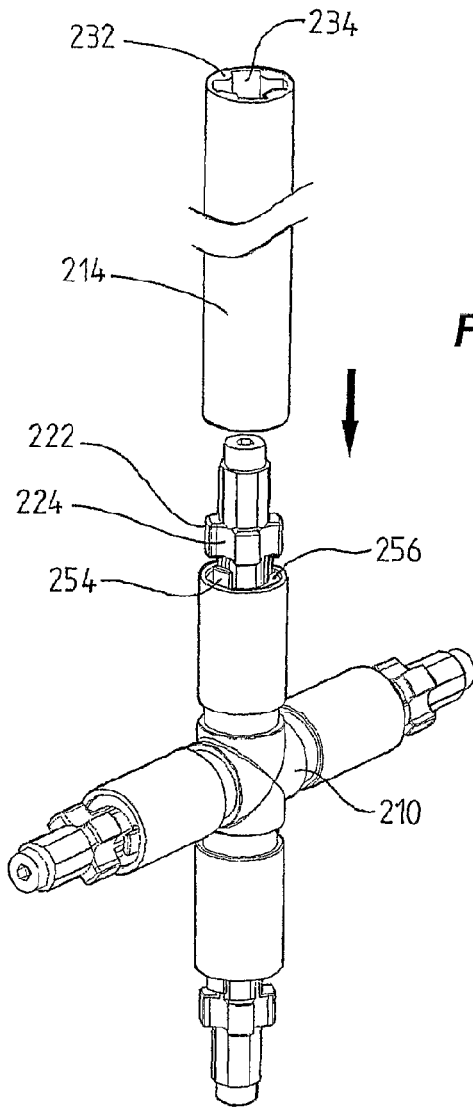
FIG. 12 is a perspective view of the first component of FIG. 9, with one second component axially aligned in position to be coupled to the first component.
Figure 13:
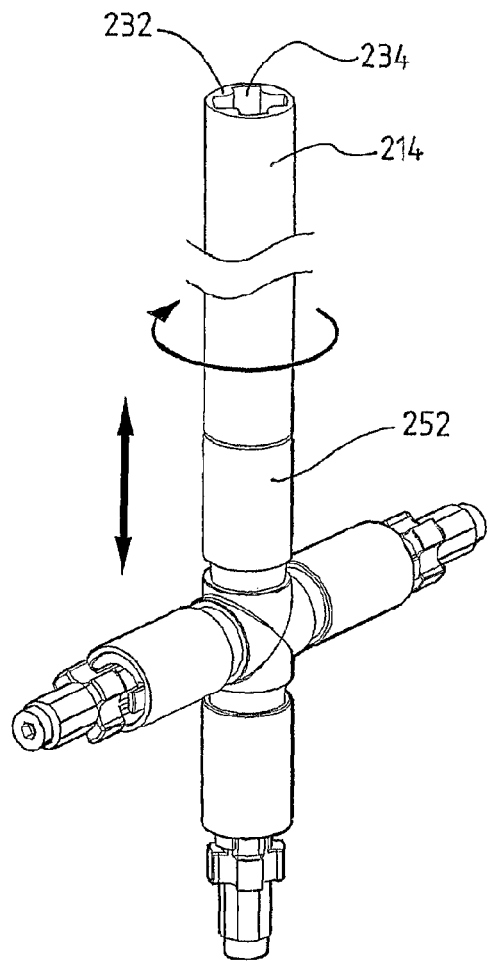
FIG. 13 is a perspective view corresponding to FIG. 12 of the first component, with the second component being rotated into engagement.
Figure 14A:
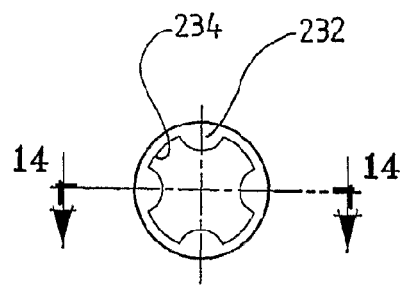
FIG. 14A is a top view of a typical second component for the set of FIG. 10.
Figure 14B:
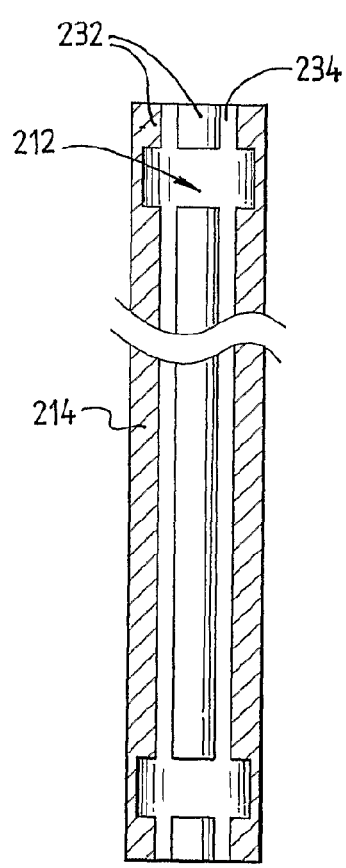
FIG. 14B is an axial cross-sectional view of the second component on line 14-14 of FIG. 14A.
Figure 14C:
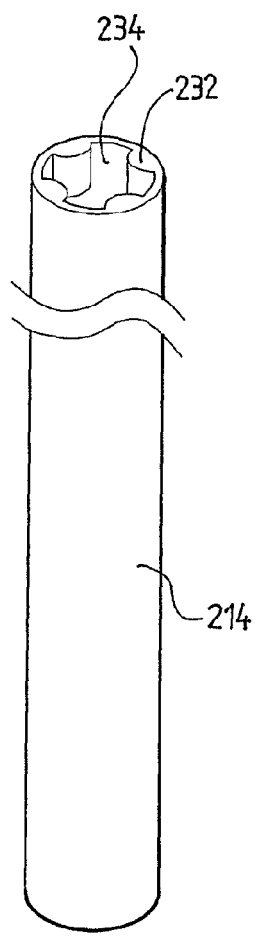
FIG. 14C is a perspective view of the second component of FIG. 14A.
Figure 15:
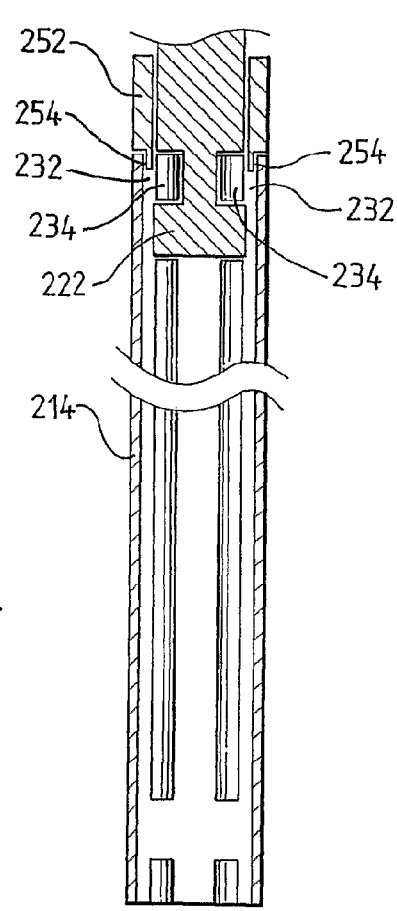
FIG. 15 is an axial cross-sectional view similar to FIG. 14B but with a stub portion connected and the locking mechanism engaged.
Figure 16:
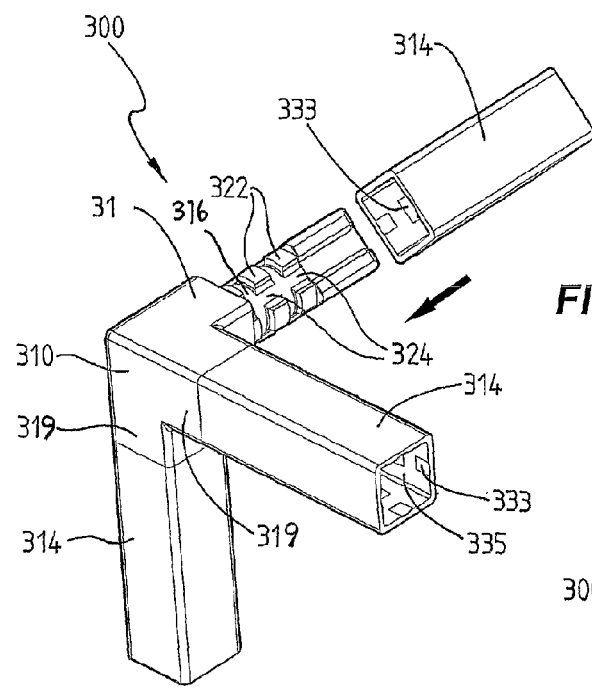
FIG. 16 is a perspective view of a set according to another embodiment of the invention prior to coupling.
Figure 17:
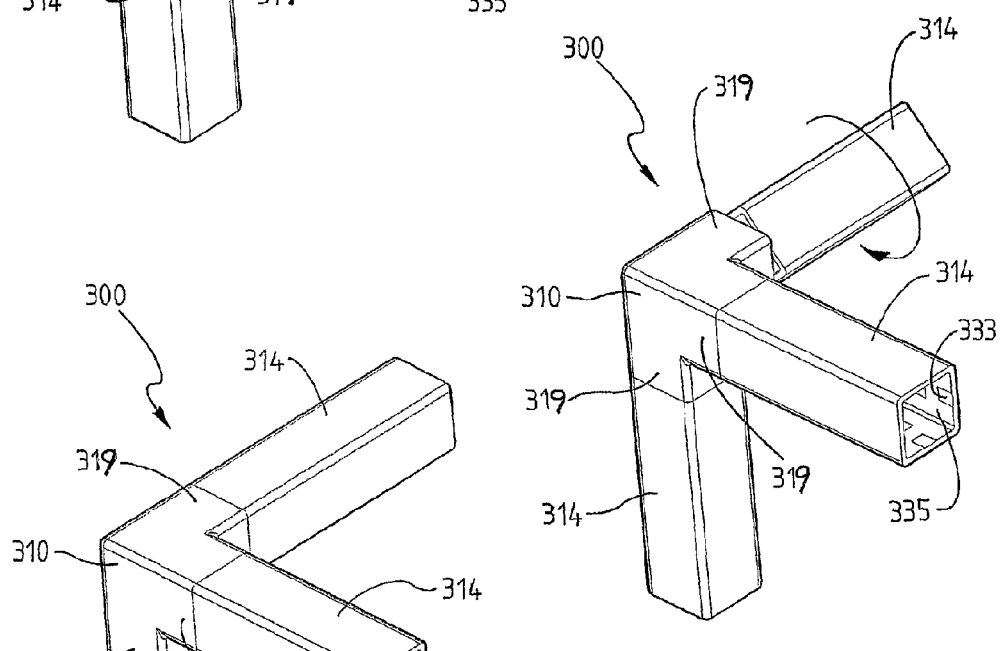
FIG. 17 is a perspective view of the set of FIG. 16 being connected.
Figure 18:
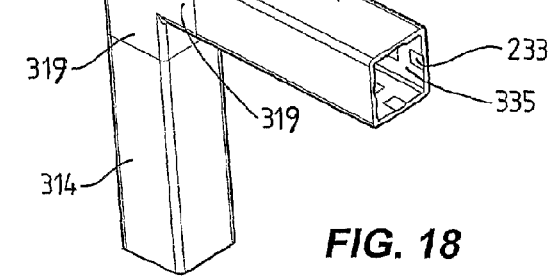
FIG. 18 is a perspective view of the set of FIG. 16 connected.

With reference to FIGS. 12 and 13, to couple a tubular component 214 to the connecting element 210, tubular component 214 is introduced onto stub portion 216, with teeth 232 aligned with troughs 224, and, on nearing its inner position, engages projections 254 of the respective sleeve 252. The tubular portion 252 is thereby pushed rearwardly against spring 251 so that the projections 254 are retracted past shoulder 256 on the forward side of land 255. This allows the socket 212 to be inserted all the way to shoulder 256, and the teeth 222 on the stub portion 216 to move relatively past the teeth 232 in the socket 212 to allow rotation. Rotation of the sleeve 214 relative to connecting element 210 then engages the corresponding teeth to prevent axial removal, and the sleeve 252 is released forwardly by spring 251 as the projections 254 are able to engage in corresponding troughs 234 in the socket 212, as shown in FIG. 15. This arrests any attempted reverse relative rotation of sleeve 252, unless sleeve 252 is first withdrawn rearwardly by hand.

It will be noted from FIG. 10 that sleeve 252 has a circumferential surface that is flush with that of tubular component 214 and with the adjacent outer face of element 210 behind shoulder 253, to provide a smooth, integral appearance.

Another embodiment of the invention is illustrated in FIGS. 16 to 22, in which elements corresponding to those of the first embodiment are indicated by similar numerals preceded by a "3". An assembly 300 includes a first component in the form of connecting element 310 that has three stub portions 316. Three respective second components in the form of tubular components 314 are coupled to the connecting element 310.

The stub portions 316 are formed with axially spaced sets of radially extending teeth 322 separated circumferentially by troughs 324. The tubular components 314 have a socket portion 334 shaped to receive one of the stub portions 316. Peripherally spaced formations 333 are provided on an interior surface 335 of the socket portion, and are formed as notches cut into the interior surface 335. The notches 333 are defined, as shown in FIG. 21, by the circumference of a circle, which is greater than the width of the interior wall of the socket portion 334.

The stub portion 316 is received within the socket 334 of the tubular component 314 by aligning the teeth 322 between the notches 333 in the corners of the socket (FIG. 19A and 19B). The stub portion 316 and socket 334 are thereafter connected by relatively rotating the tubular component 314 in 45° increments such that the teeth 322 engage within the notches 333, preventing any longitudinal movement of the tubular component 314. To disengage, the tubular component 314 is again rotated, so that the notches 333 move out of alignment with the teeth 322, allowing the tubular component 314 to be pulled away from the stub portion 316.

The various embodiments of the present invention provide an improved set of components to be coupled together that can be used to create frame structures that are robust and easy to use.

The invention claimed is:

1. A set of components able to be coupled together, including:
   a first component having one or more stub portions extending from the first component, the one or more stub portions being formed with at least one set of radially extending teeth separated circumferentially by troughs; and
   a second component having a socket portion shaped to receive one of the stub portions, wherein peripherally spaced formations are provided on an interior surface of the socket portion;
   wherein the stub portion is able to be received within the socket of the second component by aligning the teeth of the stub portion between the formations of the socket in an unlocked position, and wherein the stub portion and socket are thereafter connected by relatively rotating the first or second components such that the teeth of the stub portion engage the formations of the socket to couple the first and second components together in a locked position and
   a locating device rotatably provided on each stub portion outwardly of the radially extending teeth and troughs of the stub portion, the locating device is received within the second component ahead of said radially extending teeth and troughs and rotated with the second component allowing said peripherally spaced formations to pass the locating device, and thereby assists in locating each of the stub portions within a respective second component in the unlocked position, wherein the locating device is axially spring-loaded and the locating device and respective stub portion have complementary sets of locating teeth such that, upon passing of the spaced formations beyond the locating device, the locating device is biased against the spring and the complementary sets of locating teeth engage to limit rotation of the locating device and thereby the second component with respect to the stub portion between the locked and unlocked positions.

2. A set according to claim 1, wherein the complementary sets of locating teeth define rotation of the locating device with respect to the stub portion in 45° increments.

3. A set according to claim 1, wherein the formations are complementary teeth and
   troughs provided on an interior surface of the socket portion; and
   wherein the stub portion is received within the socket of the second component by aligning the teeth of the stub portion with the troughs of the socket, and wherein the stub portion and socket are thereafter connected by relatively rotating the first or second components such that the teeth of the stub portion engage the teeth of the socket to couple the first and second components together.

4. A set according to claim 1, wherein the formations are notches cut in the interior wall of the socket and the teeth of the stub portion engage within the notches.

5. A set according to claim 1, wherein each first component supports several stub portions.

6. A set according to claim 5, wherein the first component has three stub portions provided orthogonally to one another thereby connecting three second components.

7. A set according to claim 5, wherein a plurality of first components are provided having four stub portions provided in a plane to form a panel structure.

8. A set according to claim 1, wherein the first component includes a generally cubic central portion having respective sides.

9. A set according to claim 1, wherein the complementary sets of locating teeth define rotation of the locating device with respect to the stub portion in angular increments.

10. A frame structure including one or more of the sets according to claim 1.

11. A frame structure according to claim 10, wherein the frame structure is attached to a wall.

12. A frame structure according to claim 10, wherein the frame structure is a freestanding structure.

13. A frame structure according to claim 10, further including means for attaching at least one panel member to the structure.

14. A frame structure according to claim 13, wherein panel member is a tile, or a glass panel.

15. A set of components able to be coupled together, including:
   a first component having one or more stub portions extending from the first component, the one or more stub portions being formed with at least one set of radially extending teeth separated circumferentially by troughs; and
   a second component having a socket portion shaped to receive one of the stub portions, wherein peripherally spaced formations are provided prior to connection with the first component on an interior surface of the socket portion;
   wherein the stub portion is able to be received within the socket of the second component by aligning the teeth of the stub portion between the formations of the socket in an unlocked position, and wherein the stub portion and socket are thereafter connected by relatively rotating the first or second components such that the teeth of the stub portion engage the formations of the socket to couple the first and second components together in a locked position and
   a locating device rotatably provided on each stub portion outwardly of the radially extending teeth and troughs of the stub portion, the locating device is received within the second component ahead of said radially extending teeth and troughs and rotated with the second component allowing said peripherally spaced formations to pass the locating device, and thereby assists in locating each of the stub portions within a respective second component in the unlocked position, wherein the locating device is axially spring-loaded and the locating device and respective stub portion have complementary sets of locating teeth such that, upon passing of the spaced formations beyond the locating device, the locating device is biased against the spring and the complementary sets of locating teeth engage to limit rotation of the locating device and thereby the second component with respect to the stub portion between the locked and unlocked positions.

16. A set according to claim 15, wherein the formations are complementary teeth and troughs provided on an interior surface of the socket portion; and wherein the stub portion is received within the socket of the second component by aligning the teeth of the stub portion with the troughs of the socket, and wherein the stub portion and socket are thereafter connected by relatively rotating the first or second components such that the teeth of the stub portion engage the teeth of the socket to couple the first and second components together.

* * * * *